(12) United States Patent
Fernholz et al.

(10) Patent No.: US 10,052,646 B2
(45) Date of Patent: Aug. 21, 2018

(54) METHOD FOR TREATING OBJECTS AND SYSTEM THEREFOR

(71) Applicant: Eisenmann SE, Böblingen (DE)

(72) Inventors: Jürgen Fernholz, Herrenberg (DE); Werner Swoboda, Böblingen (DE)

(73) Assignee: EISENMANN SE, Boeblingen (DE)

( * ) Notice: Subject to any disclaimer, the term of this patent is extended or adjusted under 35 U.S.C. 154(b) by 54 days.

(21) Appl. No.: 14/379,074

(22) PCT Filed: Feb. 7, 2013

(86) PCT No.: PCT/EP2013/000362
§ 371 (c)(1),
(2) Date: Aug. 15, 2014

(87) PCT Pub. No.: WO2013/120592
PCT Pub. Date: Aug. 22, 2013

(65) Prior Publication Data
US 2015/0367371 A1    Dec. 24, 2015

(30) Foreign Application Priority Data

Feb. 18, 2012  (DE) .................. 10 2012 003 299

(51) Int. Cl.
*B05B 15/12*     (2006.01)
*B05B 14/49*     (2018.01)
(Continued)

(52) U.S. Cl.
CPC .............. *B05B 14/49* (2018.02); *B05B 16/60* (2018.02); *F26B 21/06* (2013.01); *B05B 14/43* (2018.02); *B05B 14/46* (2018.02); *Y02P 70/36* (2015.11)

(58) Field of Classification Search
CPC ........................................... B05B 15/12
(Continued)

(56) References Cited

U.S. PATENT DOCUMENTS 4,537,120 A * 8/1985 Josefsson ............ B05B 15/1222
                                                      454/52
4,687,686 A   8/1987 Stofleth et al.
(Continued)

FOREIGN PATENT DOCUMENTS

DE          42 11 465 A1   10/1993
DE   10 2010 030 280 A1   12/2011
(Continued)

*Primary Examiner* — Steven B McAllister
*Assistant Examiner* — Samantha Miller
(74) *Attorney, Agent, or Firm* — Schroeder Intellectual Property Law Group, LLC

(57) ABSTRACT

A method and system for treating objects, the objects are conveyed through a treatment cabin and treated in a treatment space. During treatment solvents are released. Cabin air flows through the treatment space, which absorbs solvents and is discharged as process air from the treatment space. At least one proportion of the process air charged with solvent is recycled in the treatment space and at least one proportion of the process air can be discharged as exhaust air. Fresh air is fed to the treatment space, which contributes to the cabin air, such that the cabin air includes a circulating air proportion and a fresh air proportion. The solvent concentration is captured in the cabin air and/or in the process air and/or in the exhaust air and the circulating air proportion and the fresh air proportion of the cabin air are regulated as a function of the captured solvent concentration.

10 Claims, 1 Drawing Sheet

(51) Int. Cl.
 *B05B 16/60* (2018.01)
 *F26B 21/06* (2006.01)
 *B05B 14/46* (2018.01)
 *B05B 14/43* (2018.01)

(58) Field of Classification Search
 USPC .......................................................... 454/53
 See application file for complete search history.

(56) References Cited

U.S. PATENT DOCUMENTS

| | | | | | |
|---|---|---|---|---|---|
| 4,729,294 | A | * | 3/1988 | Osawa | ................ B05B 15/1292 118/326 |
| 4,913,825 | A | * | 4/1990 | Mitchell | ................ C09D 7/008 210/705 |
| 4,924,801 | A | * | 5/1990 | Arnone | ............... B05B 15/1248 118/301 |
| 4,948,513 | A | * | 8/1990 | Mitchell | ................ C09D 7/008 210/705 |
| 5,023,116 | A | | 6/1991 | Williams et al. | |
| 5,039,313 | A | * | 8/1991 | Gocht | ....................... B03C 3/16 55/DIG. 46 |
| 5,078,084 | A | * | 1/1992 | Shutic | ................. B05B 15/1211 118/309 |
| 5,153,034 | A | * | 10/1992 | Telchuk | .............. B05B 15/1222 118/326 |
| 5,165,969 | A | | 11/1992 | Barlett et al. | |
| 5,284,518 | A | | 2/1994 | Kohn | |
| 5,444,029 | A | * | 8/1995 | Martin | ................... B01D 53/04 34/472 |
| 5,569,384 | A | * | 10/1996 | Saatweber | ............ B05B 15/127 210/195.2 |
| 6,146,264 | A | * | 11/2000 | Tong | ................... B05B 15/1222 454/52 |
| 2002/0096319 | A1 | * | 7/2002 | Valachovic | ......... B05B 15/1207 165/263 |
| 2005/0266171 | A1 | * | 12/2005 | Noguchi | ................. B05D 7/02 427/532 |
| 2011/0132197 | A1 | | 6/2011 | Nagase et al. | |
| 2011/0275300 | A1 | * | 11/2011 | Nudleman | .......... B05B 15/1222 454/50 |

FOREIGN PATENT DOCUMENTS

EP 0 253 980 A1 1/1988
JP 2011-230058 A 11/2011

* cited by examiner

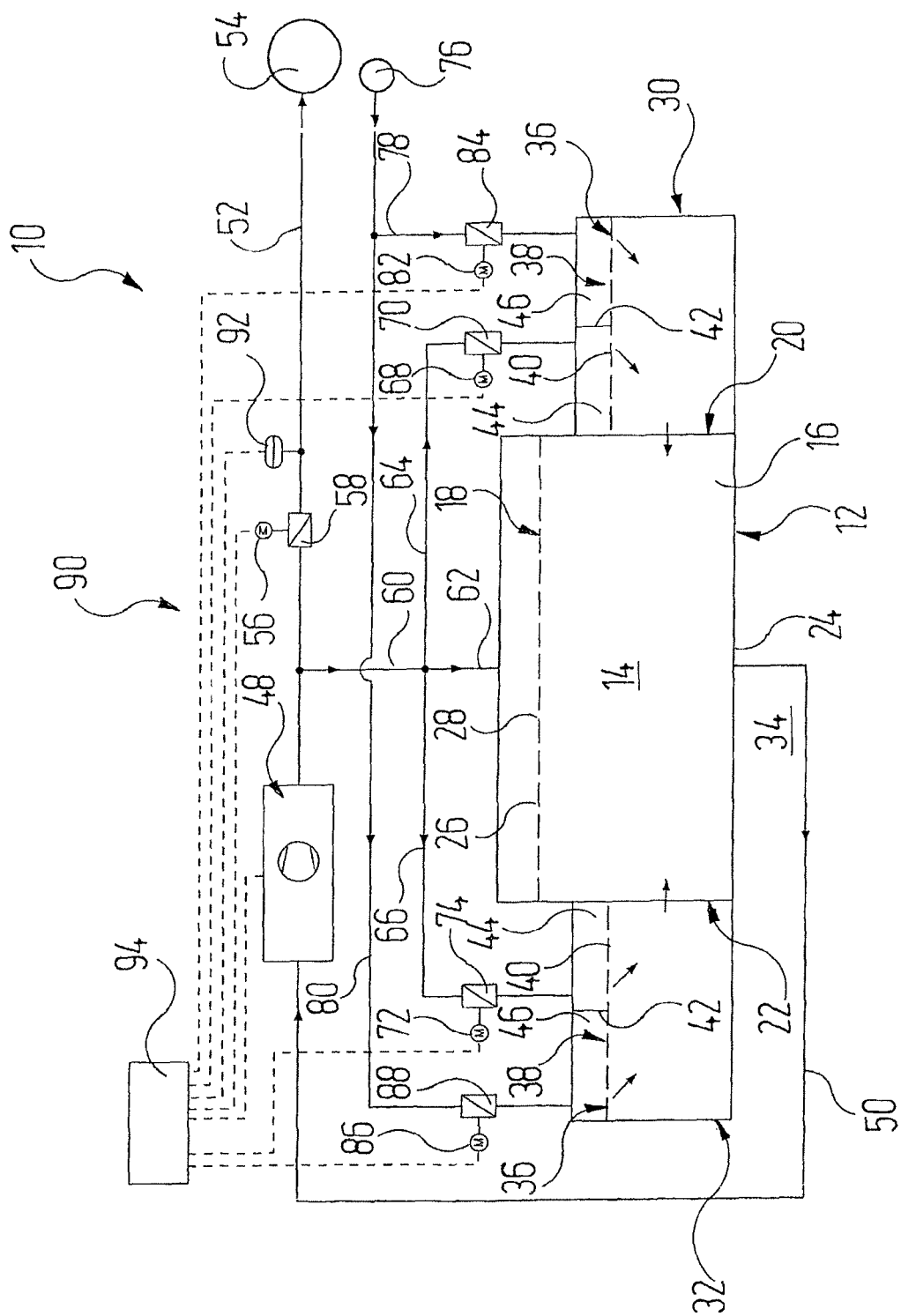

METHOD FOR TREATING OBJECTS AND SYSTEM THEREFOR

RELATED APPLICATIONS

This application is a national phase of International Patent Application No. PCT/EP2013/000362, filed Feb. 7, 2013, which claims the filing benefit of German Patent Application No. 10 2012 003 299.4, filed Feb. 18, 2012, the contents of both of which are incorporated herein by reference.

FIELD OF THE INVENTION

The invention relates to a process for treating objects, in particular for coating objects with a solvent-containing coating material, in which
a) the objects are conveyed through a treatment booth and, in a treatment chamber there, undergo a treatment in which solvent is released;
b) booth air flows through the treatment chamber, whereby it takes up solvent and discharges it from the treatment chamber as process air, during which at least a fraction of solvent-laden process air can be conveyed back into the treatment chamber in a circuit as circulating air and at least a fraction of this process air can be discharged as exhaust air;
c) fresh air, which contributes to the booth air, is moreover supplied to the treatment chamber;
so that
d) the booth air comprises a circulating air fraction and a fresh air fraction.

The invention moreover relates to an installation for treating objects, in particular for coating objects with a solvent-containing coating material, which comprises:
a) a treatment booth with a treatment chamber in which objects undergo a treatment in which solvent is released;
b) a supply air system by means of which booth air can be generated, which flows through the treatment chamber and thereby takes up solvent and discharges it from the treatment chamber as process air;
c) a circulating device through which at least a fraction of solvent-laden process air can be conveyed back into the treatment chamber in a circuit as circulating air, during which at least a fraction of the process air can be discharged as exhaust air;
d) a fresh air device by means of which fresh air, which contributes to the booth air, can moreover be supplied to the treatment chamber;
so that
e) the booth air comprises a circulating air fraction and a fresh air fraction.

BACKGROUND OF THE INVENTION

In the automobile industry, for example, vehicle bodies or parts thereof undergo treatment in which solvent can be released. The solvent can escape for example from surface coatings of the objects when these are dried in a drier. However, solvents are also already released when the objects are provided with paint or a different coating. Although, water-based coating materials have now become established, the coating materials used, and thereby particularly paints, frequently contain other solvents.

When paints are applied manually or automatically to objects, a substream of the paint, which generally contains both solid bodies and/or binding agents as well as solvent, is namely not applied to the object. This substream is known among experts as "overspray". The overspray is taken up by the booth air which flows through the paint booth and supplied for separation as process air so that, if required, at least some of this process air can be conveyed back to the coating booth as circulating air after suitable conditioning.

Whilst the solid bodies and/or binding agent constituents or other components of the overspray are separated successfully by means of the separating systems which are known per se, be they wet separators or dry separators and, in particular, electrostatically operating separating systems here, solvent remains in the process air of the paint booth even after the separation process, which then arrives back in the paint booth with the circulating air.

Since the solvent concentration in the booth air would thereby continue to increase over time, the solvent concentration in the paint booth after a certain time would be greater than a maximum permissible upper threshold value which must not be exceeded, for example for explosion prevention reasons.

For this reason, only some of the solvent-containing process air is always supplied back to the paint booth as circulating air. The remaining fraction of booth air required for the air balance is provided by unladen fresh air.

However, the solvent concentration in the process air and therefore also in the circulating air conveyed back into the paint booth greatly depends, amongst other things, on the coating materials used, the application methods and the objects to be coated and can vary considerably.

In practice, the fresh air fraction is always selected to be great enough for the solvent concentration in the booth air to always remain safely below the permissible upper threshold value for the solvent concentration. In commercially known installations and processes, the fresh air fraction and the circulating air fraction of the booth air are always specified to be fixed and unchanging. The specified ratio of fresh air to circulating air here is set on the basis of empirical values and takes into account a safety margin so that the permissible upper threshold value for the solvent concentration in the booth air is never exceeded. However, it can arise here that the supplied fresh air fraction is much greater than would be necessary to observe the explosion prevention limits and the solvent concentration in the booth air therefore falls well below the permissible amount. In the most unfavourable case, all of the booth air is made up of fresh air for safety reasons and the solvent-containing process air is discharged completely as exhaust air and supplied for example to a thermal or regenerative post-combustion installation.

However, this is a waste of energy and resources since, on the one hand, too high a fraction of the process air is not reused and, on the other, the fraction of fresh air which is supplied is too high, and this likewise requires basic conditioning which uses energy.

SUMMARY OF THE INVENTION

It is therefore an object of the present invention to provide a process and an installation of the type mentioned at the outset which take these issues into account.

This object may be achieved in a process of the type mentioned at the outset in that
e) the solvent concentration in the booth air and/or in the process air and/or in the exhaust air is measured;
f) the circulating air fraction and the fresh air fraction of the booth air are regulated depending on the measured solvent concentration.

Therefore, according to the invention, the circulating air fraction and the fresh air fraction of the booth air are regulated depending on the solvent concentration actually present in the booth air or in the process air or in the exhaust air. An upper threshold value of the solvent concentration preferably serves as a regulating parameter here, which threshold value must not be exceeded and, in the case of the process air and the exhaust air, also takes into account that the booth air takes up even more solvent as it flows through the treatment chamber. As a result of these measures, the now variable fresh air fraction of the booth air can be kept as low as possible and as high as necessary within the framework of the regulating parameters.

The solvent concentration in the booth air or the process air or to the exhaust air can be measured by calculation, accounting for certain parameters of the installation; this is also discussed again in more detail below. However, it is advantageous if the solvent concentration in the booth air and/or in the process air and/or in the exhaust air is measured by means of a solvent sensor. Sensors of this type are established in the prior art.

The circulating air can be advantageously supplied to the treatment chamber by way of an air chamber of the treatment booth and/or an entry lock and/or an exit lock.

It is favourable here if it is possible to adjust the fraction of the process air which arrives as circulating air at the air chamber of the treatment booth, at the entry lock or at the exit lock.

It is then particularly advantageous if it is possible to adjust the respective volumetric flow of the circulating air to the air chamber of the treatment booth and/or to the entry lock and/or to the exit lock. It is thereby possible to effect an individual inflow distribution of the circulating air to the individual access points of the treatment chamber.

It is advantageous if the fresh air is supplied to the treatment chamber by way of the entry lock and/or the exit lock.

With regard to an individual flow setting, it is also favourable here if it is possible to adjust the respective volumetric flow of the fresh air to the entry lock and/or the exit lock.

The object mentioned above may be achieved in an installation of the type mentioned at the outset in that
f) the circulating air fraction and the fresh air fraction of the booth air can be regulated by means of a regulating and control device depending on a measured solvent concentration in the booth air and/or in the process air and/or in the exhaust air.

The advantages of the further developments explained below correspond in essence to the advantages explained above in relation to the process.

Therefore, it is favourable if a solvent sensor is present, by means of which the solvent concentration in the booth air and/or in the process air and/or in the exhaust air can be measured.

The circulating air can preferably be supplied to the treatment chamber (14) by way of an air chamber of the treatment booth and/or an entry lock and/or an exit lock in which circulating air is conveyed through ducts.

It is further preferred for means to be present whereby it is possible to adjust the fraction of the process air which arrives as circulating air at the air chamber of the coating booth, at the entry lock or at the exit lock.

It is moreover favourable if means are present whereby it is possible to adjust the respective volumetric flow of the circulating air to the air chamber of the treatment booth and/or to the entry lock and/or to the exit lock.

The entry lock and/or the exit lock can preferably be supplied with fresh air from a fresh air source, which is conveyed into the treatment chamber by way of the entry lock and/or the exit lock.

It is moreover preferable if means are present whereby it is possible to adjust the respective volumetric flow of the fresh air to the entry lock and/or to the exit lock.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the invention is explained below with reference to the single FIGURE which shows a painting installation (denoted as a whole by 10) as an example of an installation for treating objects. Objects to be coated are not illustrated specifically here.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

As a coating booth, the painting installation 10 comprises a paint booth 12 with a paint tunnel 14 which defines a treatment chamber and is delimited by vertical side walls 16 and a horizontal booth ceiling 18, but is open at the end sides 20 and 22. The paint tunnel 14 is moreover open to the bottom by way of a booth floor 24. To this end, the booth floor 24 is constructed for example as a grating or the like. As a lower delimitation of a booth air supply chamber 26, the booth ceiling 18 is constructed as a ceiling filter 28.

The paint tunnel 14 extends between an entry lock 30 and an exit lock 32 at its end sides 20 and 22 respectively, which connect the paint tunnel 14 to an operating area 34 surrounding the paint tunnel 14. This surrounding operating area 34 is generally a workshop surrounding the paint booth 12.

Both the entry lock 30 and the exit lock 32 have a lock ceiling 36 which, as a lower delimitation of a respective lock air supply chamber 38, are constructed as a ceiling filter 40 and correspond in terms of their design to the booth ceiling 18 of the paint booth 12. The two lock air supply chambers 38 are again divided in each case by means of a partition wall 42 into a circulating air supply chamber 44 adjoining the paint tunnel 14 and a fresh air supply chamber 46 remote from the paint tunnel 14.

By means of a conveyor system (not shown specifically) objects to be painted are conveyed through the paint booth 12, during which they are transported by way of the entry lock 30 into the paint tunnel 14, coated therein with a solvent-containing coating material, for example a solvent-containing paint, by means of application devices (likewise not shown specifically) and then guided out of the paint tunnel 14 and out of the paint booth 12 by way of the exit lock 32. The freshly painted objects are then treated in subsequent stations in a manner known per se and, in particular, dried.

During the painting procedure, booth air now flows through the paint tunnel 14 and thereby takes up overspray with the solvent contained therein and discharges this from the paint tunnel 14 as process air. The painting installation 10 comprises a circulating device 48 (shown only very schematically in the FIGURE) by means of which this process air, which is then laden with overspray including solvent, is circulated in a manner known per se and substantially freed of entrained overspray particles and conditioned. To this end, the overspray- and solvent-laden process air arrives by way of the booth floor 24 in a suction duct 50 by way of which it is extracted and drawn in from the paint tunnel 14 by the circulating device 48.

As defined by the terms explained at the outset, in the following text "booth air" will describe that air which flows through the paint tunnel 14 and thereby takes up solvent. The term "process air" on the other hand refers to this booth air after it has flowed through the paint tunnel 14 and has exited it via the suction duct 50, irrespective of whether or not this has been subjected to further treatment. On the other hand, the treated process air is—at least in part—supplied back into the paint tunnel 14 in a circuit as "circulating air". The term "exhaust air" refers here to that fraction of the process air which is not supplied back into the paint tunnel 14 in a circuit as circulating air.

To separate the overspray particles from the solvent-containing process air, known filter technologies, such as electro-filters, inertia separators, fleece filters, absolute filters, wet separators and the like, are used in the circulating device 48. The subsequent conditioning can refer in particular to a re-adjustment of the temperature and humidity.

From the circulating device 48, an air duct 52 leads to a regenerative or thermal post-combustion installation 54. The air duct 52 can be opened or closed variably by means of a regulating flap 58 operated by way of a servomotor 56. Branching off from the air duct 52 between the circulating device 48 and the regulating flap 58, there is a circulating air duct 60 which in turn forks into a circulating air duct 62 leading to the paint booth 12, a circulating air duct 64 leading to the entry lock 30 and a circulating air duct 66 leading to the exit lock 32.

The circulating air duct 62 leading to the paint booth 12 opens into the booth air supply chamber 26 of the paint booth 12. The circulating air duct 64 leading to the entry lock 30 leads to the circulating air supply chamber 44 of the entry lock 30 and the circulating air duct 66 leading to the exit lock 32 leads accordingly to the circulating air supply chamber 44 of the exit lock 32. The circulating air duct 64 leading to the entry lock 30 can be opened or closed variably by means of a regulating flap 70 operated by way of a servomotor 68. In corresponding manner, a regulating flap 74 operated by way of a servomotor 72 is present in the circulating air duct 66 leading to the exit lock 32.

A fraction of the solvent-containing process air is now conveyed back into the paint tunnel 14 in a circuit as circulating air. By means of the regulating flap 58 in the air duct 52, it is possible to adjust the fraction of solvent-laden process air coming from the circulating device 48 which is guided to the post-combustion installation 54 as exhaust air or back into the paint booth 14 in a circuit as circulating air. Therefore, if the regulating flap 58 closes the air duct 52, all of the solvent-containing process air, for example, is guided into the paint booth 14 in a circuit as circulating air.

By means of the regulating flaps 70 and 74 in the circulating air ducts 64 and 66 leading respectively to the entry lock 30 and the exit lock 32, it is moreover possible to adjust the fractions of this circulating air which flow into the booth air supply chamber 26 and into the circulating air supply chambers 44 of the entry lock and the exit lock 30 and 32. The circulating air then flows out of the booth air supply chamber 26 from top to bottom into and through the paint tunnel 14. From the circulating air supply chambers 44, the circulating air arriving there flows into the respective lock 30 and 32 and from there in a substantially horizontal direction into the paint tunnel 14, as indicated by arrows in the FIGURE.

The fresh air supply chambers 46 of the entry lock 30 and the exit lock 32 are fed with fresh air from a fresh air source 76 by way of a fresh air duct 78 leading to the entry lock 30 and a fresh air duct 80 leading to the exit lock, which together form a fresh air device. The fresh air duct 78 leading to the entry lock 40 can be variably opened or closed by means of a regulating flap 84 operated by way of a servomotor 82. To adjust the volumetric flow, a regulating flap 88, which is operated by way of a servomotor 86, is also arranged in the fresh air duct 80 leading to the exit lock 32.

The fresh air flows out of the fresh air supply chambers 46 into the respective lock 30 and 32 and from there in a substantially horizontal direction into the paint tunnel 14, whereby it mixes with the circulating air from the respective circulating air supply chamber 44 along the flow path.

The booth air flowing through the paint tunnel 14 therefore comprises a circulating air fraction and a fresh air fraction. To this end, the circulating device 48 with the associated ducts 50, 52, 60, 62, 64 and 66 together with the fresh air source 76 and the fresh air ducts 70 and 80 with all servomotors and regulating flaps as a whole form a supply air system 90, with which the booth air which flows through the paint tunnel 14 is generated.

Arranged in the air duct 52, downstream of the regulating flap 58, there is a solvent sensor 92 by means of which the solvent concentration of the solvent-containing exhaust air flowing to the post-combustion installation 54 can be measured, as is known per se. The solvent sensor 92 transmits its output signals to a control and regulating unit 94 which in turn controls the circulating device 48, i.e. its suction power, and the servomotors 56, 68, 72, 82 and 86 of the regulating flaps 58, 70, 74, 84 and 88. The communication and control ducts from and to the control and regulating unit 94 are only shown by dashed lines and are not denoted specifically by a reference character.

The transmission of the output signals of the solvent sensor 92 can take place continuously or in clocked manner, wherein, in the latter case, the time intervals between two measurements of the solvent concentration in the exhaust air depend on the operating parameters of the installation 10, such as the type of application, the coating material and the objects to be coated.

During operation of the painting installation 10, the circulating air fraction and the fresh air fraction of the booth air are now regulated depending on the solvent concentration in the solvent-containing exhaust air.

If the solvent concentration thereof increases and approaches a specified threshold value, which must not be exceeded for example for explosion prevention reasons, the fraction of the solvent-containing circulating air guided in the circuit decreases. To this end, the control and regulating unit 94 controls the servomotor 56 so that the regulating flap 58 opens and the volumetric flow of the exhaust air via the air duct 52 to the post-combustion installation 54 is increased.

However, the total quantity of booth air flowing through the paint tunnel 14 has to remain constant and must not drop.

Therefore, conversely, the servomotors 82 and 86 are controlled so that the regulating flaps 84 and 88 in the fresh air ducts 78 and 80 are open wide enough for the now decreased circulating air flow over the circulating air ducts 62, 64 and 66 to be equalised.

All in all, this decreases the circulating air fraction of the booth air and increases the fresh air fraction of the booth air. As a result of the now higher fraction of fresh air in the both air guided as a whole through the paint tunnel 14, the concentration of the solvent entrained therein is decreased.

If the data from the solvent sensor 92 reflect a solvent concentration which is below the upper permissible threshold value, there is a saving potential for fresh air. Therefore, in this case, the servomotors 56, 82 and 86 are controlled so that the regulating flap 58 in the air duct 52 closes and the regulating flaps 84 and 88 in the fresh air ducts 78 and 80 open accordingly. As a result, the fraction of solvent-containing circulating air in the booth air which is guided as a whole through the paint tunnel 14 is increased again and the fraction of supplied fresh air is decreased again.

All in all, the servomotors, regulating flaps and ducts 56 to 88 and the regulating and control unit 94 together establish a regulating and control device which, depending on the solvent concentration in the exhaust air discharged from the paint tunnel 14, can therefore regulate the circulating air fraction and the fresh air fraction of the booth air flowing as a whole through the paint tunnel. In practice the actual solvent concentration in the exhaust air is always maintained at the maximum permissible upper threshold value so that the necessary contribution of fresh air to the booth air is always as small as possible.

By means of the regulating flaps 70 and 74 in the circulating air ducts 64 and 66 leading to the entry lock 30 and to the exit lock 32, it is moreover possible to individually adjust the fraction of circulating air, and therefore the respective volumetric flow of the circulating air, which arrives at the entry lock 30, at the exit lock 32 and at the booth air supply chamber 26. The respective volumetric flows can also deviate from one another.

The latter also applies to the fresh air flows which are guided to the entry lock 30 and to the exit lock 32. In this way, with a known solvent concentration of the exhaust air from the paint tunnel 14, it is additionally possible to adjust the solvent concentration of the supply air entering the paint tunnel 14 by way of the entry lock 30 or the exit lock 32 separately in each case, whereby the volumetric flows of the supply air from the locks 30, 32 into the paint tunnel 14 can, on the whole, be kept constant.

In pause mode, during which no treatment is carried out in the paint tunnel 14 or in a treatment chamber in general and therefore no further solvent is released, it is even possible to completely recirculate the process air without fresh air having to be introduced into the booth air. To this end, the air duct 52 is closed completely by the regulating flap 58, as a result of which all the process air flows into the circulating air duct 60 and back to the paint booth 12.

To regulate and control the painting installation 10, it is essentially important to measure the solvent concentration of the solvent-containing air flowing out of the paint tunnel 14. In the painting installation 10 mentioned above, this is achieved by the solvent sensor 92 which measures the solvent concentration in the exhaust air.

In a modification which is not shown specifically, a solvent sensor can also be positioned at other points, for example directly upstream or downstream of the circulating device 48, so that it is possible to measure the solvent concentration in the process air. It is also possible to arrange a solvent sensor for the booth air in the paint tunnel 14, by means of which the solvent concentration in the paint tunnel 14 and therefore in the booth air can be measured. Moreover, a solvent sensor can be present in the circulating air duct 60, in the circulating air duct 62 leading to the paint booth 12, in the circulating air duct 64 leading to the entry lock 30 and/or the circulating air duct 66 leading to the exit lock 32, whereby it is possible to measure the solvent concentration in the circulating air. All in all, a single solvent sensor or even a plurality of solvent sensors can be present in the above-mentioned positions as an alternative or in addition to the solvent sensor 92 for the exhaust air.

In a further modification, it is however also possible to dispense with a solvent sensor of this type if the solvent concentration is measured by calculating the actual solvent concentration of the solvent-containing exhaust air or the solvent-containing booth air. The data required for this can be obtained for example in that the quantity of paint delivered by the application devices is monitored in real time in a manner known per se whilst taking into account the surface of the objects to be coated and the average quantity of paint applied thereto.

In the case of a real-time calculation of the solvent concentration, it is firstly possible to measure the dependencies of the regulating variables on the volumetric flows of the circulating air and the fresh air as a type of calibrating parameter in a test operation, and the painting installation 10 is then operated on the basis of these calibration parameters.

It is optionally possible to dispense with the partition wall 42 in the lock air supply chambers 38. In a further modification (not shown specifically) the fresh air duct 78 together with the circulating air duct 64 leading to the entry lock 30 and the fresh air duct 80 with the circulating air duct 66 leading to the exit lock 32 can be merged to form a respective mixing duct which then leads into the respective lock air supply chamber 38 of the entry lock 30 or the exit lock 32.

In this case, the fresh air and the circulating air are mixed together in this mixing duct and arrive together in the respective lock air supply chamber 38, which then likewise no longer has to be constructed in two parts.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. An installation for treating objects comprising:
   a) a treatment booth with a treatment chamber in which objects undergo a treatment in which solvent is released;
   b) a supply air system by means of which booth air can be generated, which flows through the treatment chamber and thereby takes up solvent and discharges it from the treatment chamber as process air;
   c) a circulating device by means of which at least a fraction of solvent-laden process air is conveyed back into the treatment chamber in a circuit through a set of circulating air ducts as circulating air, during which at least a fraction of the process air can be discharged as exhaust air;

d) a fresh air device by means of which fresh air, which contributes to the booth air, can moreover be supplied to the treatment chamber through a fresh air duct;
so that
e) the booth air comprises a circulating air fraction and a fresh air fraction;
wherein
f) the circulating air fraction is regulated by means of at least a first regulating device; and the fresh air fraction is regulated by means of at least a second regulating device, wherein the at least first regulating device and the at least second regulating device are independently controlled by a control device depending on a measured solvent concentration in the booth air and/or in the process air and/or in the exhaust air.

2. The installation for treating objects according to claim 1, wherein a solvent sensor is present whereby the solvent concentration in the booth air and/or in the process air and/or in the exhaust air can be measured.

3. The installation for treating objects according to claim 1, wherein the circulating air can be supplied to the treatment chamber by way of an air chamber of the treatment booth and/or an entry lock and/or an exit lock into which circulating air is conveyed through ducts.

4. The installation for treating objects according to claim 3, wherein means are present whereby it is possible to adjust the fraction of the exhaust air which arrives as circulating air at the air chamber of the treatment booth, at the entry lock or at the exit lock.

5. The installation for treating objects according to claim 4, wherein means are present whereby it is possible to adjust the respective volumetric flow of the circulating air to the air chamber of the treatment booth and/or to the entry lock and/or to the exit lock.

6. The installation for treating objects according to claim 1, wherein fresh air can be supplied to and entry lock and/or an exit lock from a fresh air source, which fresh air is conveyed into the treatment chamber by way of the entry lock and/or the exit lock.

7. The installation for treating objects according to claim 6, means are present whereby it is possible to adjust the respective volumetric flow of the fresh air to the entry lock and/or to the exit lock.

8. The installation for treating object according to claim 1 wherein at least a portion of the circulating air is supplied directly back into the treatment chamber by the circulating device.

9. The installation for treating objects according to claim 8 wherein the fresh air is supplied to the treatment chamber through at least one entry point remotely located from an entry point of the portion of circulated air directly supplied back into the treatment chamber by the circulating device.

10. The installation of treating objects according to claim 9 wherein a second portion of the circulating air is supplied to the treatment chamber by the circulating device through the at least one entry point used to supply the fresh air.

* * * * *